Figure 9:
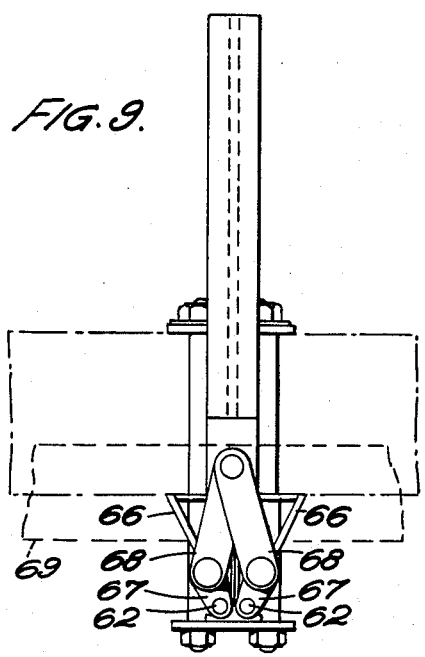

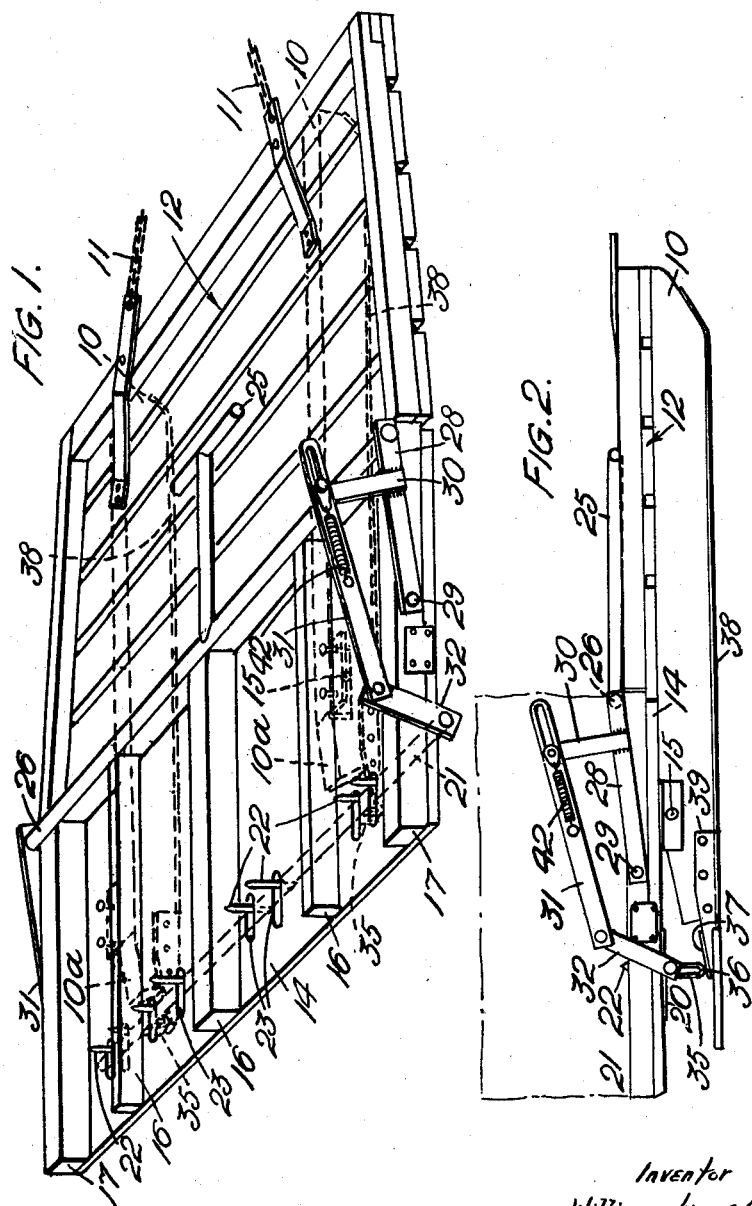

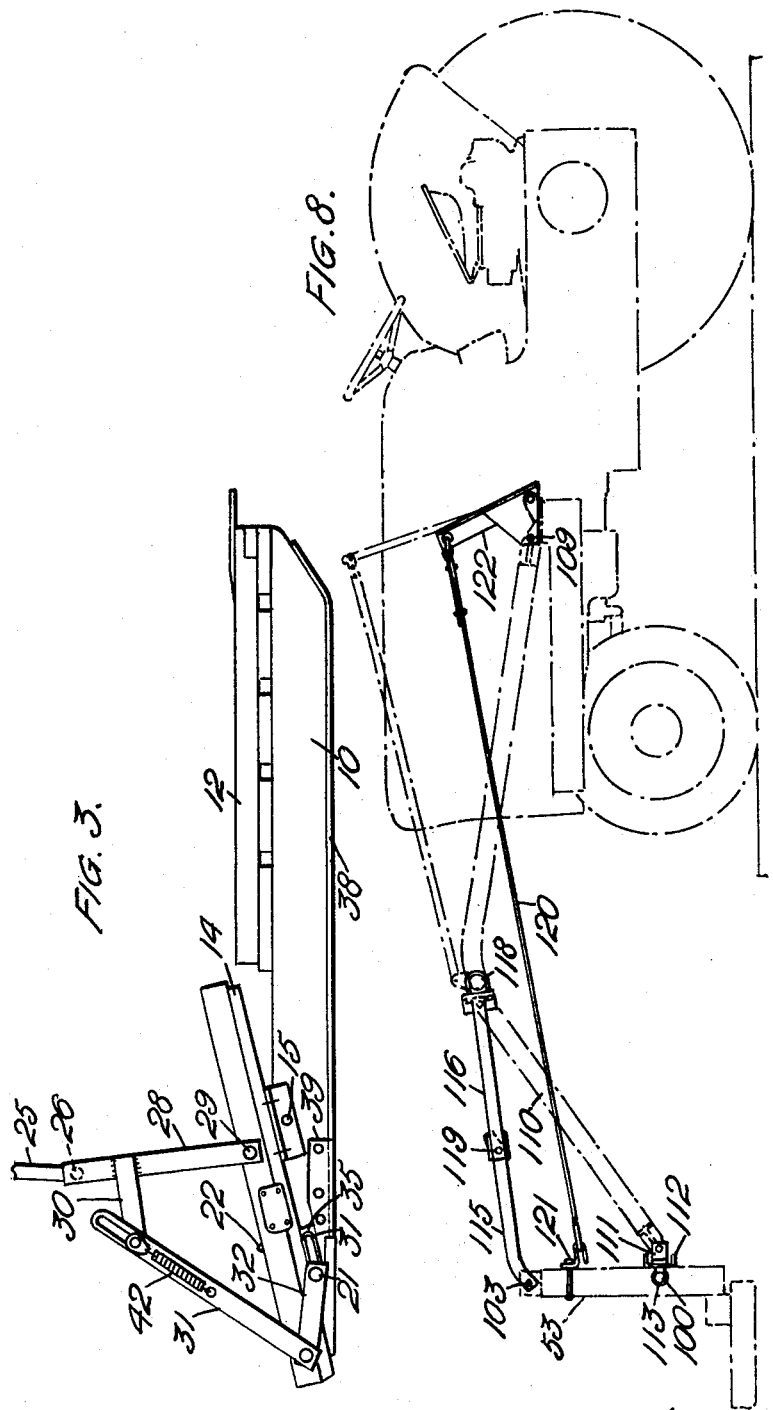

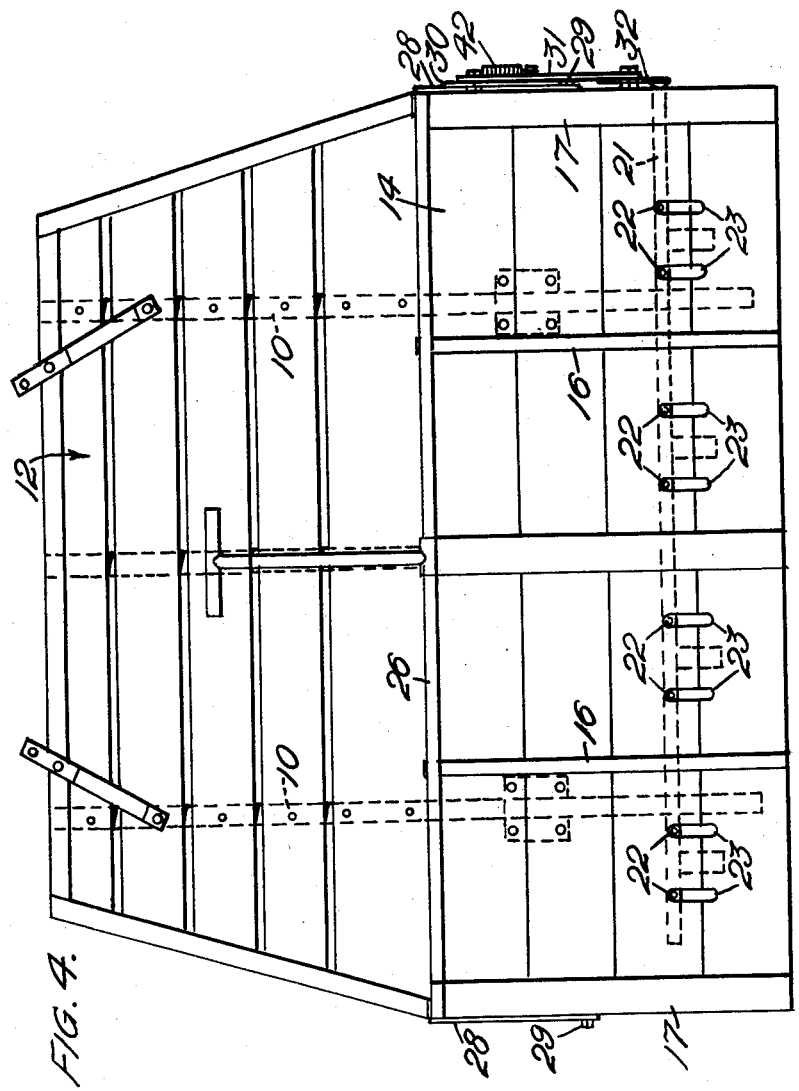

Nov. 3, 1964  W. J. GALE  3,155,415
TRACTOR ATTACHMENTS
Filed Oct. 11, 1960  7 Sheets-Sheet 4
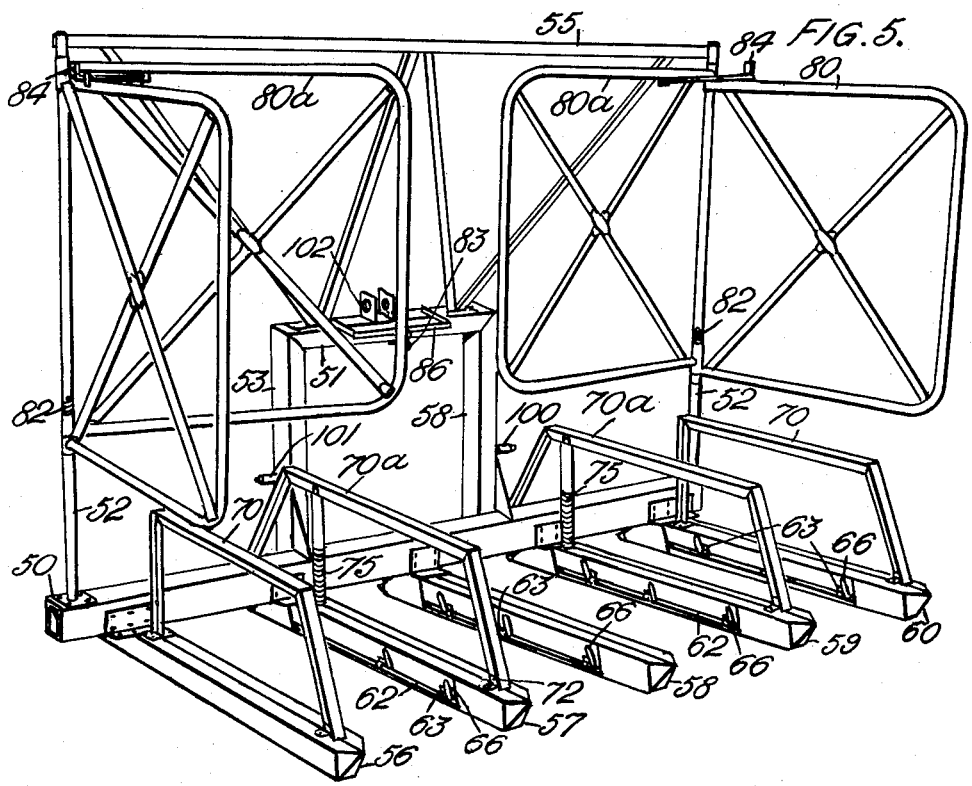
Inventor
William James Gale
By Hooper, Leonard & Thiel
his Attorneys

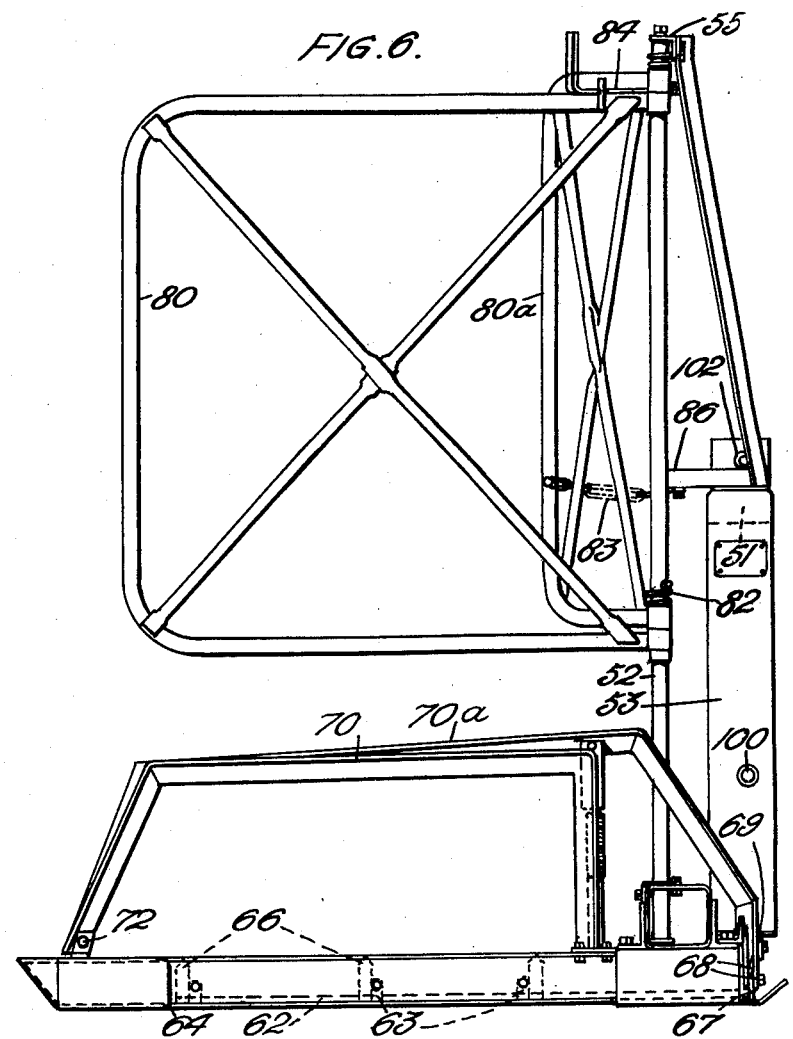

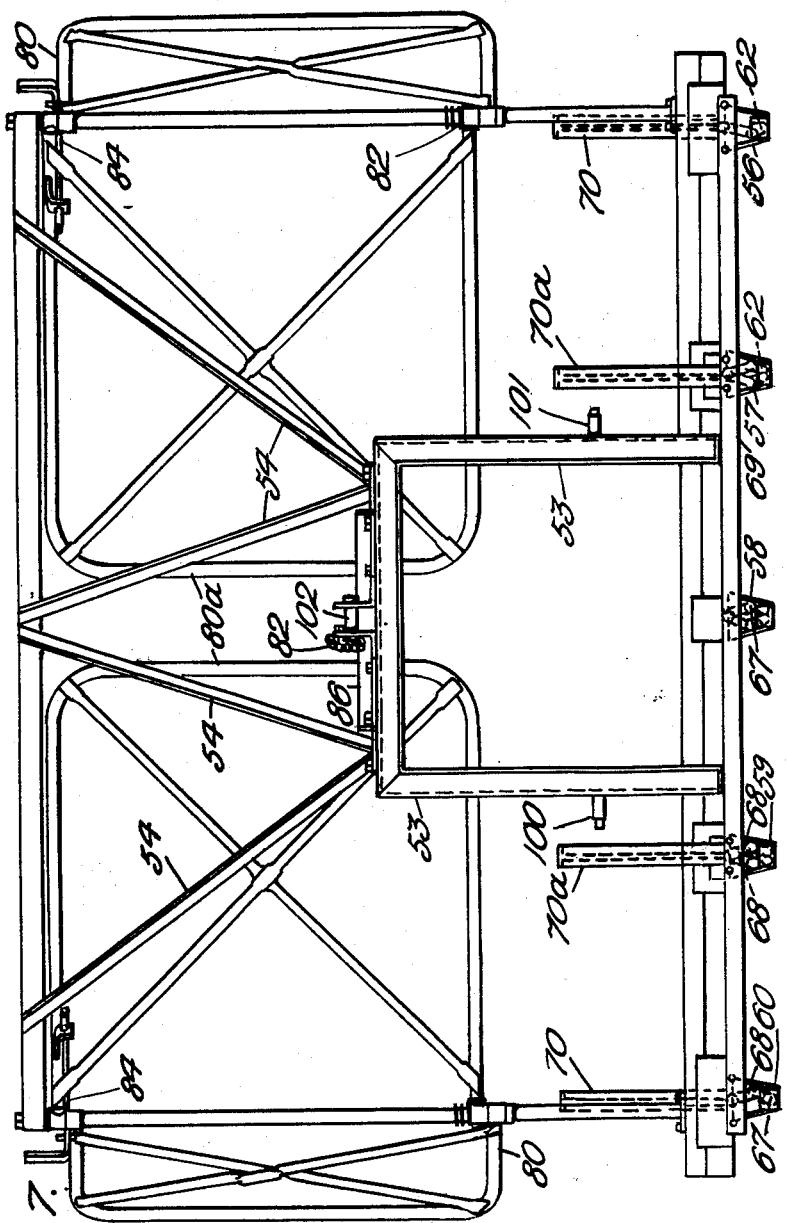

Nov. 3, 1964 W. J. GALE 3,155,415
TRACTOR ATTACHMENTS
Filed Oct. 11, 1960 7 Sheets-Sheet 7

Inventor
William James Gale
his attorneys

United States Patent Office 3,155,415
Patented Nov. 3, 1964

3,155,415
TRACTOR ATTACHMENTS
William James Gale, Reeves Farm, Bratton, Westbury, Wiltshire, England, assignor of one-half to Trojan Limited, Croydon, England, a British company
Filed Oct. 11, 1960, Ser. No. 92,429
Claims priority, application Great Britain, Oct. 12, 1959, 34,506/59; Dec. 4, 1959, 41,359/59
1 Claim. (Cl. 294—67)

The invention relates to devices to be used as attachments for agricultural tractors, for facilitating the manipulation of bales of hay, straw or the like.

The ordinary baling machine produces individual bales and deposits these haphazard over the field so that they have to be collected and loaded individually onto some form of transport by which they can be carried to a storage location. There are accordingly two problems which arise. Firstly it would be helpful if the bales could be delivered as accumulations at a few locations in the field. Secondly there is the problem of lifting and transporting such accumulations or of lifting and loading them onto transport means. The invention is primarily concerned with the second of these problems although it has, as a subsidiary purpose, the provision of means whereby suitable accumulations of bales may be made.

The invention provides a device for use in lifting a row of bales of hay, straw or the like lying on the ground in parallel but spaced apart relation, which device comprises a row of parallel tines spaced to enter between the bales and outside the ends of the row, engaging means projectable laterally from the tines into gripping and holding engagement with the bales and means interconnecting the tines at the rear ends thereof whereby they may be lifted as a unit carrying the bales.

Preferably the device has mechanism for effecting the lateral projection of the engaging means, which mechanism is responsive to engagement, during an initial upward movement of the tines, with an upper row or layer of bales on top of the row aforesaid. The mechanism may be arranged to support and lift, during upward movement of the tines, an upper layer or part thereof of a stack of bales. The device is therefore suitable for lifting a stack of bales which has the bales of the lowermost layer parallel and spaced apart for reception between them of the tines and an upper layer of which the bales lie transversely across those of the lower layer and across the gaps between them. There may be additional layers on top of the two layers just described. In use the tines are inserted into the gaps between the lowermost bales and the engaging means are automatically projected into those bales as the device is raised. The upper bales are lifted directly by the mechanism aforesaid and, it may be, by other parts of the device.

To produce an accumulation of bales as just described it is preferred to employ an accumulator which receives the bales as delivered individually from a baling machine and delivers them as such on accumulation, the accumulator comprising running means for running on the ground, a towing coupling whereby said running means may be attached, directly or indirectly, to a baling machine to be towed thereby, and a carrier platform supported on said running means for pivotal movement about a horizontal axis transverse to the direction of running between a bale receiving and carrying attitude in which it is substantially horizontal or upwardly sloping from front to rear and a bale discharging attitude in which it is downwardly sloping from front to rear, said carrier platform being sufficiently wide to receive several bales in side by side relation, the length of the bales being in the running direction and having separators extending in the running direction defining channels or areas in which a bottom layer of bales may be located in side by side spaced apart relation.

Preferably the accumulator has an operator's platform which is mounted on said running means to travel in front of said carrier platform and on which may travel an operator.

The accumulator may also have retractable prongs projecting upwardly from the carrier platform to assist in holding the bales on the platform.

In use the operator first places a bale in each channel to form a bottom layer and then places a second layer of bales crosswise on top of the first layer and, it may be, a further layer or layers on top of the second. Accordingly there is accumulated a small stack of bales which is discharged as such onto the ground. In this stack the lowermost bales are spaced apart and the bales of the next upper layer lie crosswise on the bales of the lowermost layer and so bridge the gaps between them.

A specific embodiment of the invention will now be described by way of example and with reference to the accompanying drawings in which:

FIGURE 1 is a perspective view of the bale accumulator, the carrier platform being shown in the receiving attitude in full lines and in the discharging attitude in chain lines, FIGURE 2 is a side view of the accumulator with the carrier platform in the receiving position, FIGURE 3 is a view similar to FIGURE 2 but showing the platform in the discharge position, FIGURE 4 is a plan view of the accumulator, FIGURE 5 is a perspectve view of the lifting device, FIGURE 6 is a side view of the lifting device, FIGURE 7 is a back view of the lifting device, FIGURE 8 is a diagrammatic side view showing the lifting device on a tractor, and FIGURE 9 is an enlarged view of part of FIGURE 7.

The bale accumulator shown in FIGURES 1–4 is in the form of a sledge which travels on runners 10 and is towed, by chains 11, behind a hay or straw baling machine. Fixed to the front of the runners there is an operator's platform 12 of trapezium shape. Behind the operator's platform there is a receiving platform 14 which is pivoted to the runners at 15 about a horizontal transverse axis just in front of the centre of gravity of the platform when loaded. The upper surface 10a of the runners slopes downwardly from the pivot 15 so that the platform may move to the sloping, discharge, attitude seen in FIGURE 3. The upper surface of the platform 14 is divided into four bale-receiving channels by separators 16 and end members 17. Each channel is of a size to receive one bale with its length in the running direction and the separators 16 have a width (e.g. four inches) which keeps the bales sufficiently spaced to receive between them the tines of the lifting device later described. If it is desired to adapt the accumulator to bales of smaller sizes, wooden battens may be fixed alongside the end members 17 and the outer pair of separators 16.

Secured by four clips 20 to the underside of the platform 14 and behind the centre of gravity there is a rotatable cross-tube 21 to which are fixed radial prongs 22 which in one rotational position of the cross-tube project upwardly through slots 23 in the platform to engage and hold the bales on the platform. In another rotational position of the cross-tube they are withdrawn rearwardly below the platform as seen in FIGURE 3. Rotation of the cross-tube between these two positions is effected by means of a handle 25 which is attached to a cross-member 26 which is carried on two arms 28 which are pivoted to the carrier platform at 29. One of the arms has a side projection 30 which is connected by a link 31 to an arm 32 on the cross-tube 21. Movement of the handle 25 from the full line to the chain line position shown in FIGURE 1 withdraws the tines. The connection between the link 31 and the projection 30 incorporates a slot and there is a spring 42 which tends to keep the connection at the end of the slot, as shown. The arrangement permits the bales, once movement off the sledge has been initiated, to continue their movement rotating the prongs as far as may be necessary to release the bales, without further movement of the handle.

Projecting radially from the cross-tube 21 there are two arms 35 which are welded to the tube and terminate in curved bearing surfaces 36. These bearing surfaces work on bearing plates 37 fixed on the runners 10. As the handle 25 is moved from the upright position of FIGURE 3 forwardly and downwardly to the position of FIGURE 2 the arms 35 act as cams bearing on the plates 37 and serve to rock the carrier platform from the discharging attitude to the receiving attitude. Reverse movement of the handle permits the platform to return, by gravity to the discharging attitude. The runners 10 have metal shoes 38 which are formed with side flanges 39 which are bolted to the runners and carry the plates 37.

The cross-member 26 serves as a pusher which operates to effect discharge of the bales as the handle is raised to the position shown in FIGURE 3 and in chain lines in FIGURE 1. Accordingly, such movement of the handle withdraws the prongs 22, releases the platform to move to the discharging attitude and, if necessary, pushes the bales off the platform, the movement of the bales being caused or assisted by the sloping attitude of the platform and, almost immediately, by the drag of the bales on the ground.

The lifting device, which is shown in FIGURES 5–8 will now be described. This device is intended to be attached, by its main frame, to the front or the rear lifting mechanism of an agricultural tractor and its purpose is to lift from the ground a stack of bales as discharged from the accumulator as described above and to transport the bales to a storage site or to put them onto another vehicle such as a flat platform trailer. It may be used to build the bales into a larger stack.

The device comprises a main frame composed of a cross-member 50, a top rail 55, two end uprights 52, two intermediate uprights 53 with a top bar 51 and stays 54. Suitable means for attachment to the tractor are provided on this frame and comprise three connecting pins 100, 101 and 102 on the uprights 53 and bar 51.

Projecting from the cross-member 50 there are five parallel tines 56–60, each composed of two channel members secured back-to-back and provided with end caps. Along each side of the tines 57, 58 and 59 and along the inner side of each tine 56 and 60 there is a rod 62 which is supported for rotation in bearings provided by three cleats 63 and the bottom angles 64 of the tine section. Three prongs 66 extend radially from each rod 62. At the rear end of each rod 62 there is a radial arm 67. These arms are connected by links 68 to rail 69, the arrangement being that downward movement of the rail acts through links 68 and arms 67 to rotate the rods to move the prongs 66 from the retracted, generally upright, position shown, to a projected position in which they project substantially horizontally from the tines.

Each of the tines 56, 57, 59 and 60 has a frame 70, 70a which projects upwardly to a height which is equal to or slightly less than the height of a bale whereby when the tine is inserted between a pair of bales lying on the ground and is raised, the frame will engage and raise a bale lying cross-wise over the pair. The frames 70 associated with tines 56 and 60 are fixed thereto. In the case of each of the tines 57 and 59 however the frame 70a is pivoted at 72 to the front end of the tine. Each of the frames 70a is attached at its rear end to the cross-rail 69 and directly, or through the rail, to the links 68 so that downward movement of the frames 70a will effect projection of the prongs 66. Such downward movement occurs when the tines are raised and the frames 70a take the weight of a cross-wise bale. Springs 75 are provided for effecting return upward movement of the frames 70a and hence retraction of the prongs.

In the use of the device, as so far described, the device is moved by the tractor up to the stack on the ground and the tines pushed into the spaces between the bales of the bottom layer, and around the ends of the layer. The device is then lifted by the tractor whereby the upper bales are lifted by the frames 70, 70a, and the bales of the bottom layer are engaged by the prongs 66 and lifted thereby. When the device is lowered the reverse action takes place. It will be appreciated that the frames 70, 70a, especially the frames 70, provide lateral support for the lowermost bales and, depending on the formation of the stack, that may be the primary function of the frames 70.

Pivotally supported on the uprights 52 at the ends of the main frame there are a pair of right-angled tubular frames or "gates" 80, 80a. These gates normally lie in the slightly diverging attitude as shown, being urged by springs 82 into the diverging attitude and held against further movement by chains 83. However when the device is engaged with a stack, the cross-wise limbs 80a of the gates engage the back of the stack and the gates are rotated to bring the side limbs 80 against the ends of the stack and thereby not only serve to support the stack but also to correct any irregularities in its formation. A stop 86 limits rearward movement of the limbs 80a. The two frames of each gate are pivoted together and held in their right-angled relation by a releasable latch 84. Either of these latches may be disconnected so that the corresponding frame limb 80 may be swung clear when the device is to be used for placing the stacks side-by-side to build up a larger stack. Alternatively one of the frames may be removed to facilitate the building of a larger stack. To facilitate stowage and transit both frame limbs 80 may be disconnected from the latches 84 and be folded against the limbs 80a.

The separation of the tines may be adjusted to suit bales of different sizes.

As already stated, the lifting device may be attached to a tractor by means of the pins 100, 101, 102. When the device is to be attached to the normal draft and lifting mechanism at the rear of an agricultural tractor, the three links of the mechanism are attached to the three pins respectively.

The device may alternatively be attached to the front loader arms sometimes provided on agricultural tractors. There may be one device at the rear and one at the front. FIGURE 8 shows the device attached to the front loader arms 110 of a typical tractor construction. These arms, which are pivoted at 109, are attached to the device by forks 111 on a cross-beam 112 provided with eyes 113 which fit on the pins 100 and 101 of the device. There is also provided a two part telescopic link 115, 116 which couples the pin 103 to a fixed point 118 on the arms 110. A latch or bolt 119 holds the link closed and is releasable by means of a cable from the driver's seat. With the arrangement as so far described, the device, as it is raised, is tilted rearwardly (clockwise in FIGURE 8) through a small angle. This follows naturally from the movement of the arms 110 and is of practical advantage in that it helps to retain the bales on the device during transportation. However for the purpose of unloading the bales at a raised position, it is important that the tines remain horizontal. To achieve this result there is provided, at each side of the tractor, a cable 120 which connects a point 121 on uprights 53 with a standard 122 fixed to the tractor, the arrangement providing a parallel motion for the uprights 53. To bring the arrangement into use it is only necessary to release the latch 119 of link 115, 116, which enables the link to extend while the cables take the weight and form the top member of a parallel motion linkage. Similar arrangements may be adopted, with obvious modifications, for tractors with front loaders of other but basically similar designs.

I claim:

A device for use in lifting a row of bales of hay, straw or the like lying on the ground in parallel but spaced apart relation which device comprises a row of parallel tines spaced to enter between the bales and outside the end of the row, means interconnecting the tines at the rear ends thereof whereby they may be lifted as a unit, rods running one along each side of the intermediate tines of the row and along the inner sides of the tines at the ends of the row, means on the tines supporting the rods for rotation about their axes, a plurality of prongs extending radially from each rod into the spaces between the tines, spring means urging the prongs to slope upwardly from the rods and means responsive to the weight of the bales on lifting movement of the tines for effecting rotation of the rods in the direction to move the prongs downwardly and outwardly into penetrating and holding engagement with bales between the tines.

References Cited in the file of this patent

UNITED STATES PATENTS

| | | |
|---|---|---|
| 2,530,375 | Cartwright | Nov. 21, 1950 |
| 2,658,635 | Nelson | Nov. 10, 1953 |
| 2,681,741 | Bickerstaff | June 22, 1954 |
| 2,740,250 | Olson | Apr. 3, 1956 |
| 2,771,204 | McCormick | Nov. 20, 1956 |
| 2,833,109 | Walker | May 6, 1958 |
| 2,975,918 | Sharp | Mar. 21, 1961 |
| 2,979,216 | Edwards | Apr. 11, 1961 |
| 2,983,397 | Hirschboeck | May 9, 1961 |
| 2,989,201 | Hansen | June 20, 1961 |

FOREIGN PATENTS

| | | |
|---|---|---|
| 566,388 | Belgium | Apr. 30, 1958 |